United States Patent [19]
Nonaka

[11] Patent Number: 5,715,480
[45] Date of Patent: Feb. 3, 1998

[54] REMOTE CONTROL CAMERA USING OPTICAL SIGNAL

[75] Inventor: Osamu Nonaka, Sagamihara, Japan

[73] Assignee: Olympus Optical Co., Ltd., Tokyo, Japan

[21] Appl. No.: 692,382

[22] Filed: Aug. 5, 1996

[30] Foreign Application Priority Data

Aug. 23, 1995 [JP] Japan ................... 7-214903

[51] Int. Cl.⁶ ................................ G03B 17/00
[52] U.S. Cl. .............. 396/59; 396/100; 396/268; 396/271; 396/276
[58] Field of Search ................ 396/263, 48, 100, 396/101, 162, 171, 268, 269, 271, 272, 276, 393, 56–59, 106, 109, 300

[56] References Cited

U.S. PATENT DOCUMENTS

| | | | |
|---|---|---|---|
| 4,313,654 | 2/1982 | Matsui et al. | 354/25 |
| 4,534,637 | 8/1985 | Suzuki et al. | |
| 5,014,080 | 5/1991 | Miyadera | 354/403 |
| 5,119,123 | 6/1992 | Tominaga et al. | 354/402 |
| 5,172,155 | 12/1992 | Kosaka | 354/403 |
| 5,198,849 | 3/1993 | Hirai | 354/410 |
| 5,317,354 | 5/1994 | Kosako | 354/266 |
| 5,491,529 | 2/1996 | Iwai et al. | 354/266 |
| 5,517,276 | 5/1996 | Higaki et al. | 354/403 |
| 5,519,466 | 5/1996 | Arai | 354/403 |
| 5,528,337 | 6/1996 | Kawano | 354/266 |
| 5,541,703 | 7/1996 | Suzuka | 354/403 |
| 5,541,704 | 7/1996 | Dunsmore | 354/410 |
| 5,621,494 | 4/1997 | Kazumi et al. | 396/56 |
| 5,634,144 | 5/1997 | Mauro et al. | 396/57 |
| 5,636,143 | 6/1997 | Takahashi | 364/526 |

FOREIGN PATENT DOCUMENTS 58-100840  6/1983  Japan.

OTHER PUBLICATIONS

Applied Physics, vol. 4, No. 5, pp. 451–455, 1995 with attached partial English translation.

*Primary Examiner*—Safet Metjahic
*Assistant Examiner*—John Chizmar
*Attorney, Agent, or Firm*—Frishauf, Holtz, Goodman, Langer & Chick

[57] ABSTRACT

A camera body has at least one opening formed in a front position thereof for receiving optical information about a subject. A remote control light sensor is provided within the camera body to receive a remote control light signal emitted from an external remote control transmitter. An optical unit is placed between the opening and the remote control light sensor to direct at least the remote control light signal onto the light sensor. A control unit is responsive to an output of the remote control light sensor to control a predetermined operation associated with the camera body.

15 Claims, 9 Drawing Sheets

FIG. 12

REMOTE CONTROL CAMERA USING OPTICAL SIGNAL

BACKGROUND OF THE INVENTION

1. Field of the Invention

The present invention relates to a remote control camera and, more specifically, to a camera having a remote control function that allows the camera operation to be remotely controlled by a light signal.

2. Description of the Related Art

As a conventional mode of use of cameras, there is known the use of a self-timer for a self-photographing technique that allows the photographer to be included in the photograph.

With the advances in technology relating to electronic circuits and optical semiconductors, remote control cameras which are so easy to operate that photographers cannot miss shooting chances have come into wide use in recent years.

Such remote control cameras are generally arranged such that an infrared-light remote control signal is transmitted from the associated remote control transmitter and then received by the camera to thereby determine the shutter release timing.

However, in order for the camera to receive the remote control signal from the transmitter located away from it with a sufficient sensitivity, it is required for the camera to have a large lens for receiving the remote control signal.

In contrast, the current trend is to make cameras compact. Increasing the size of the remote control signal receiving lens so as to receive the signal with a sufficient sensitivity as described above has thus required other features (i.e., features other than the remote control feature) to be removed or reduced.

To follow the trend to compact cameras, Jpn. Pat. Appln. KOKAI Publication No. 58-100840 discloses a technique of allowing the objective lens to serve as the autofocusing (AF) lens, thereby decreasing the number of lenses at the front of the camera body.

With this technique, however, it is required to project a sharp spot of AF light onto a subject. However, it has been very difficult to design a camera so as to solve chromatic aberration problems associated with the lens and meet the above-described requirement of compactness.

In addition, the above Jpn. Pat. Appln. KOKAI Publication discloses nothing about the remote control of cameras.

SUMMARY OF THE INVENTION

It is, therefore, an object of the present invention to provide a remote control camera which can attain its remote control feature even with a remote control light signal emitted from a distantly located remote-control transmitter and which can be made compact.

According to an aspect of the invention there is provided a remote control camera comprising: a camera body having at least one opening formed on a front portion thereon for introducing optical information about a subject; a remote control light sensor placed inside said camera body for receiving a remote control light signal emitted from an external remote control transmitter; optical means placed between said light sensor and said opening for directing said remote control light signal onto said remote control light sensor; and control means placed inside said camera body and responsive to an output signal from said remote control light sensor for controlling a predetermined operation associated with said camera body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 9A through 9D show an arrangement and circuit of the of the package in the light receiving section of FIG. 9A;

DETAILED DESCRIPTION OF THE PREFERRED EMBODIMENTS

Reference will now be made in detail to the presently preferred embodiments of the present invention as illustrated in the accompanying drawings, in which like reference numerals designate like or corresponding parts throughout several drawings.

Before describing the preferred embodiments of the present invention, it will serve us for better understanding of the invention to describe the basic concepts of remote control cameras of the present invention.

Figure 10:
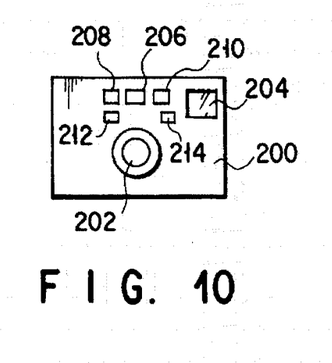
FIG. 10 is a front view of a camera for use in explanation of the basic concepts of the remote control cameras of the present invention.

As shown in FIG. 10, generally a remote control camera includes, on the front of its camera body 200, a photo-taking lens 202, an electronic flash unit 204, a viewfinder 206, windows 208 and 210 for autofocusing (AF), a light sensor window 212 for measuring exposure, and a window 214 for receiving a remote control light signal.

The present invention is intended to allow the light sensor window 212, the viewfinder 206, the electronic flash unit 204, or the autofocusing windows 208 and 210 to serve as the remote control light signal receiving window 214 as well, thereby saving space in the front of a compact camera.

In general, when sunlight or visible light from an artificial source of light falls on an infrared remote control sensor, the sensor sensitivity (signal-to-noise ratio) is lowered, which will decrease the range of distance over which the remote control transmitter can operate on the camera. In the worst case, even when the transmitter is located at a close distance from the camera, the camera may become inoperable.

Therefore, the present invention is intended to prevent visible light from falling on the remote control sensor with the aid of a filter or other optical means, thereby ensuring the remote control performance and allowing the camera to be made compact without sacrifice of its other features.

Hereinafter, the preferred embodiments of the present invention will be described with reference to the accompanying drawings.

Figure 1A:
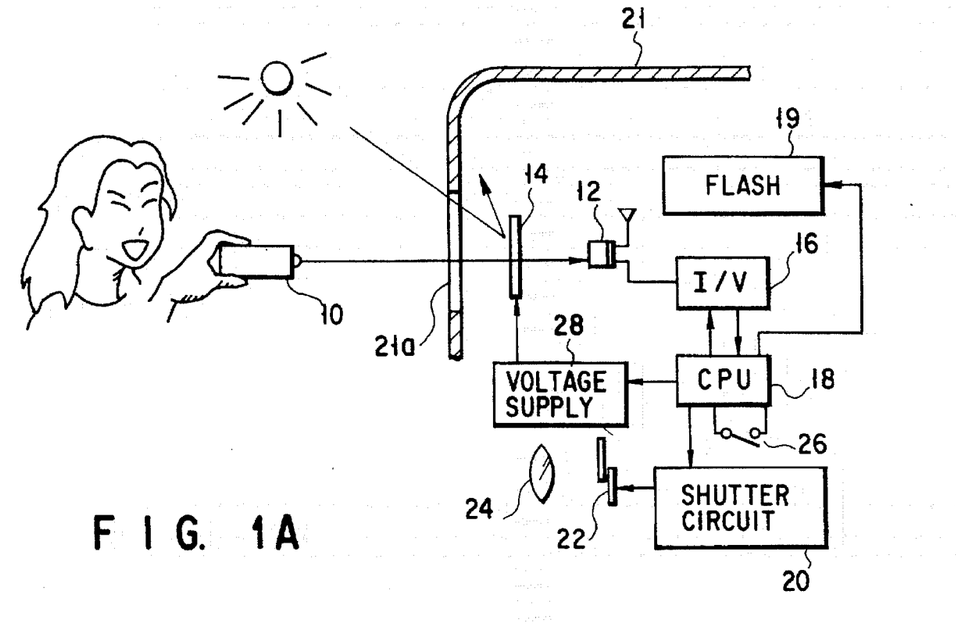
FIG. 1A shows an arrangement of a remote control camera according to a first embodiment of the present invention.

Referring to FIG. 1A, there is shown an arrangement of a remote control camera according to a first embodiment of the present invention.

In this figure, infrared light emitted from a remote control transmitter 10 falls on a light sensor 12 within a camera body 21 through a variable wavelength filter 14 placed between the light sensor and a window 21a formed in the front of the camera body 21. The variable wavelength filter 14 consists of a plurality of electric-field controlled birefringent (doubly reflecting) cells (hereinafter referred to as ECB cells) which are stacked one above the other.

Upon receipt of the infrared light emitted from the remote control transmitter 10, the light sensor 12 outputs a current signal to a current-to-voltage converter 16 (hereinafter referred to as the I/V converter).

The I/V converter 16 amplifies the current signal from the light sensor 12 and converts it to a voltage signal, which, in turn, is applied to an operation control circuit (hereinafter to as CPU) which comprises a microcomputer.

it should be noted here that, at the time of remote control operation, the I/V converter 16 converts the current signal to a digital signal alternating between high and low levels using a waveshaping function, and at the time of photometry, the converter outputs an analog voltage the magnitude of which corresponds to the amount of light falling on the light sensor 12.

The CPU 18 converts the analog voltage at the time of photometry to a corresponding digital voltage by a built-in analog-to-digital converter and measures the amount of light to thereby determine the exposure time according to the sensitivity of a film loaded into the camera body.

At this point, the CPU 18 also controls an electronic flash unit 19 according to the amount of light determined.

The CPU 18 then controls the opening and closing of a shutter 22 through a shutter circuit 20.

Thus, light transmitted through a photo-taking lens 24 is allowed to fall on the film.

A remote control switch 26 connected to the CPU 18 is adapted to set the mode of operation of the camera to the remote control mode in which a remote control signal is emitted from the remote control transmitter 10, then received.

The variable wavelength filter 14 allows the range of wavelengths of light that transmits through it to be varied by changing the magnitude of a voltage applied to the ECB cells by means of a voltage supply circuit 28. The filter is generally a variable wavelength filter known as Lyot-filter which uses liquid crystal material and has a narrow bandpass characteristic (see Applied Physics, vol. 4, no. 5, pp. 451–455, 1995).

The variable wavelength filter 14 employs the property that the Lyot-filter consisting of birefringent plates and parallel polarizers has the peak of its transmission spectrum controlled by the birefringence factor and the thickness of the birefringent plates.

In the variable wavelength filter, the birefringent plates are replaced with electrically controllable ECB cells.

Each of the ECB cells consists of nematic liquid crystal sandwiched by two sheets of glass each with a transparent conductive coating on its outer surface.

Figure 2:
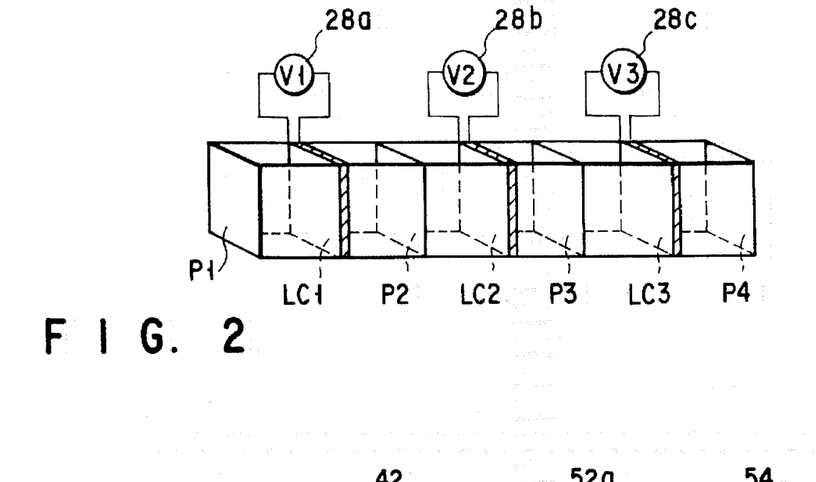
FIG. 2 shows an arrangement of the variable wavelength filter shown in FIG. 1A.

FIG. 2 shows an arrangement of the variable wavelength filter 14.

As shown, the filter comprises four polarizers P1, P2, P3 and P4 and three ECB cells LC1, LC2, and LC3 each of which is placed between the adjacent polarizers. The ECB cells LC1, LC2 and LC3 are connected with voltage supply circuits 28a, 28b, and 28c, respectively.

The ECB cells LC1, LC2 and LC3 are supplied with voltages V1, V2, and V3 from the voltage supply circuits 28a, 28b, and 28c, respectively, thereby allowing wavelengths that pass through the filter 14 to be variably controlled.

The remote control camera shown in FIG. 1A is placed in the remote control mode by the remote control switch 26 being turned on.

In the remote control mode, the variable wavelength filter 14 is controlled so that only infrared light will pass through it. That is, visible light, such as sunlight, is blocked.

Thus, the filter 14 allows only infrared light emitted from the remote control transmitter 10 to pass through and fall on the light sensor 12. The signal-to-noise ratio in the light sensor is improved.

Figure 1B:
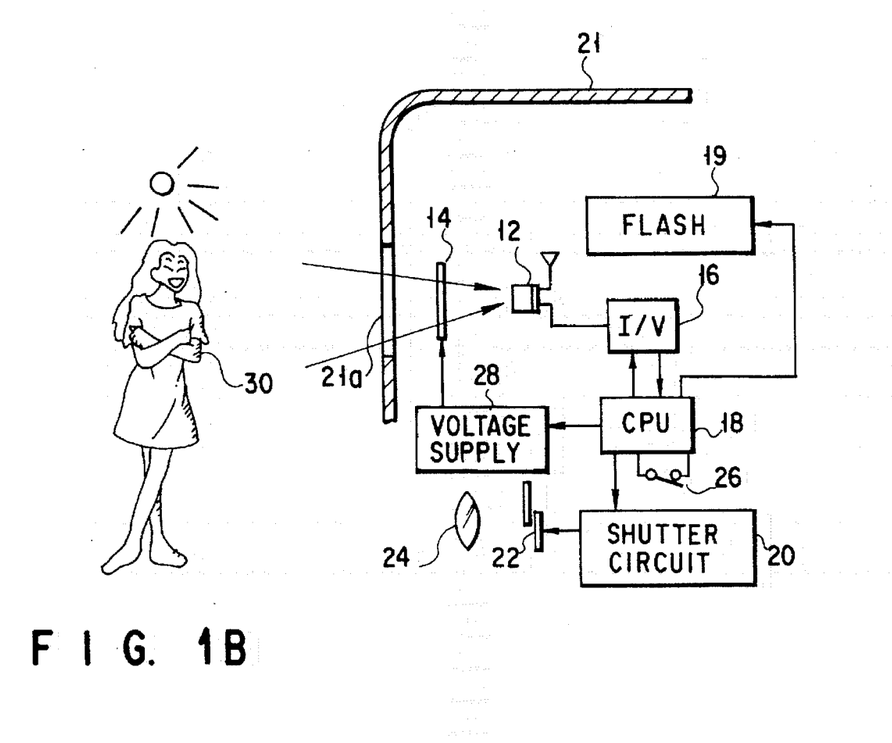
FIG. 1B shows the remote control camera of FIG. 1A at the time of light metering.

FIG. 1B shows the light measurement mode of the remote control camera according to the first embodiment.

In FIG. 1B, the variable wavelength filter 14 is controlled by the voltage supply circuit 28 (corresponding to the voltage supply circuits 28a, 28b, and 28c) so as to block infrared light and let only visible light to pass through.

Thereby, light reflected from a subject 30 falls on the light sensor 12, allowing the brightness of the subject to be measured.

Next, the operation of the remote control camera thus constructed will be described.

Figure 3:
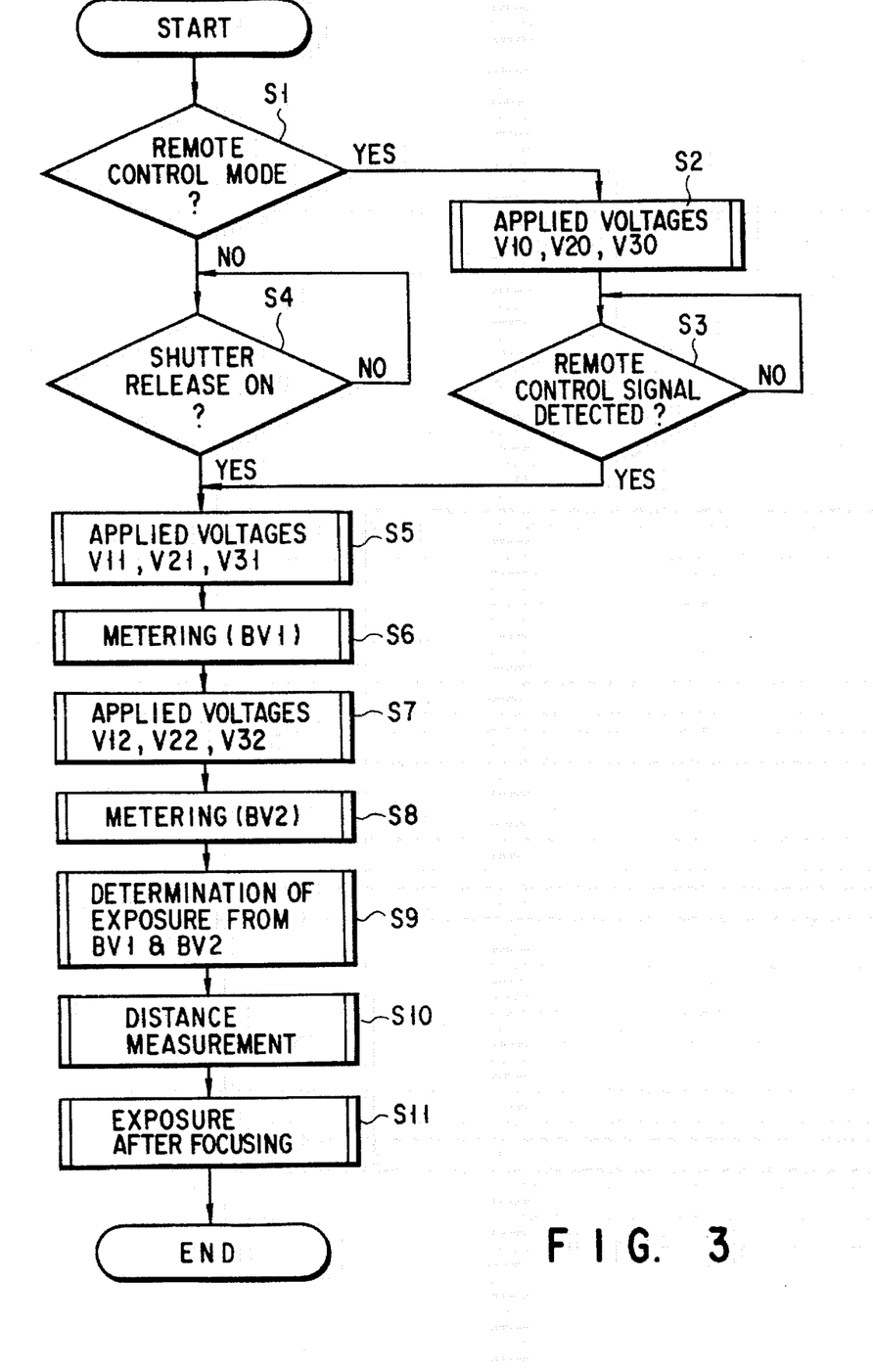
FIG. 3 is a flowchart illustrating the procedure carried out by the CPU of FIG. 1A for the remote control operation of the camera according to the first embodiment of the present invention.

FIG. 3 is a flowchart illustrating the procedure carried out by the CPU 18 for the operation of the remote control camera according the first embodiment of the present invention.

First, the CPU 18 makes a decision as to whether or not the camera is placed in the remote control mode, i.e., whether or not the remote control switch 26 is turned on (step S1).

When the remote control mode is set, the CPU 18 sets the supplied voltages V1, V2 and V3 from the voltage supply circuits 28a, 28b and 28c to the ECB cells LC1, LC2 and LC3 to V10, V20 and V30, respectively, thereby allowing the variable wavelength filter 14 to pass only infrared light through it (step S2).

Subsequently, the CPU detects a remote control light signal through the light sensor 12 and the I/V converter 16 (step S3). When the remote control signal is detected, the procedure goes to step S5.

In step S1, on the other hand, when the remote control mode is not set, the CPU 18 makes a decision as to whether or not the shutter release button not shown has been pressed (step S4). If the shutter release button has been pressed, then the procedure goes to step S5.

In step S5, the CPU 18 sets the applied voltages V1, V2, and V3 to the ECB cells LC1, LC2, and LC3 to V11, V21, and V31, respectively, thereby allowing the variable wavelength filter 14 to pass only visible light in a first predetermined wavelength band through it.

Thus, only visible light in the first wavelength band will fall on the light sensor 12.

The CPU 18 then measures light through the light sensor 12 and the I/V converter 16 on the basis of a light component in the first wavelength band to obtain a measured value BV1 (step S6).

In step S7, the CPU 18 respectively sets the applied voltages V1, V2, and V3 to the ECB cells LC1, LC2, and LC3 to V12, V22, and V32 each of which differs from a corresponding one in step S5, thereby allowing the variable wavelength filter 14 to pass only visible light in a second predetermined wavelength band (as opposed to the first wavelength band in step S5) through it.

Thus, only visible light in the second wavelength band Will fall on the light sensor 12.

The CPU 18 then measures light through the light sensor 12 and the I/V converter 16 on the basis of a light component in the second wavelength band to obtain a measured value BV2 (step S8).

That is, since the variable wavelength filter 14 has a narrow bandpass filtering characteristic as described above, visible light can be split into two components in the first and second wavelength bands to obtain the measured values BV1 and BV2.

Subsequently, the CPU 18 determines an exposure value from the measured values BV1 and BV2 (step S9).

If the variable wavelength filter 14 could be arranged temporarily to pass light components in the entire visible wavelength band, then it would be unnecessary to obtain multiple measured values.

Next, the CPU 18 measures the distance to a subject by means of known means to obtain distance information (step S10).

After that, the CPU 18 brings the subject into focus by means of known autofocusing means responsive to the distance information and then carries out an exposure sequence (step S11). Thus, the procedure comes to an end.

As described above, according to the first embodiment of the present invention, use is made of a variable wavelength filter that allows its wavelength passband to be varied electrically, which prevents visible light from falling on a light sensor which serves as a remote control sensor. Thus, the camera size can be decreased with the remote control performance and other features maintained.

That is, in the first embodiment of the present invention, since a light sensor for light measurement can also used as a light sensor for remote control, the numbers of light sensor windows, light sensors and other members can be decreased.

Note that it is also possible to use a light sensor for distance measurement based on infrared light as a light sensor for exposure measurement as well.

Moreover, it is also possible to use an active autofocusing infrared-light sensor as a passive autofocusing visible-light sensor.

Furthermore, since, in the first embodiment of the present invention, a variable wavelength filter is used which allows its wavelength passband to be varied electrically, the control of applied voltages to the ECB cells constructing the filter permits components in various wavelength bands to be selectively measured.

Thus, this will allow greater precision exposure control and flash control including the color tone of a subject as will be described later in connection with an eighth embodiment of the invention.

A remote control camera according to a second embodiment of the present invention will be described next.

Although, in the first embodiment, electric circuits and liquid crystal material are used to vary the filter passband, the second embodiment uses a visible-light blocking filter and a design technique for the light receiving surface of a light sensor to provide the same advantages as the first embodiment with a simpler arrangement.

Figure 4A:
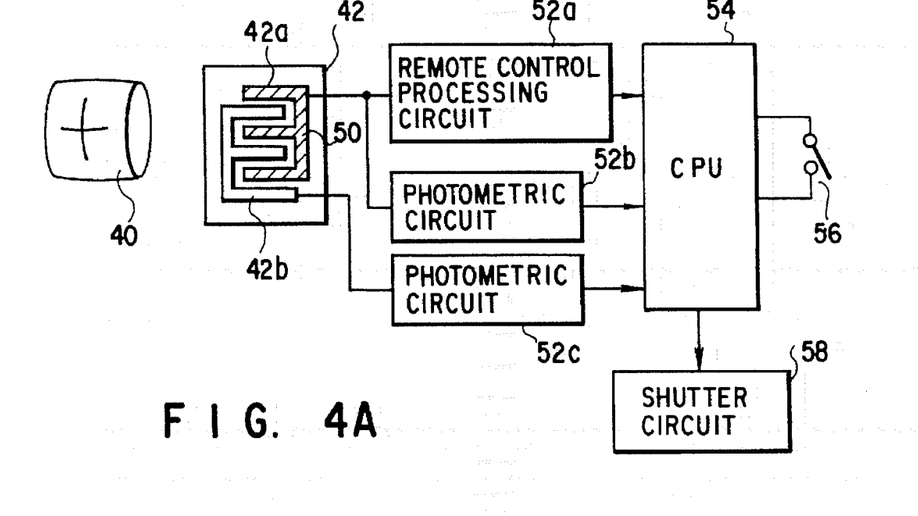
FIG. 4A shows an arrangement of a remote control camera according to a second embodiment of the present invention.

FIG. 4A shows an arrangement of the remote control camera of the second embodiment.

In this figure, a lens 40 allows light reflected from a subject to fall on a light sensor 42 having two light receiving surfaces 42a and 42b.

In the light sensor 42, the light receiving surfaces 42a and 42b are each formed in the shape of the letter E on one chip with one interdigitated with the other as shown. The light receiving surface 42a is covered with a film 50 (hatched portion) which serves as a visible-light cut filter.

Figure 4B:
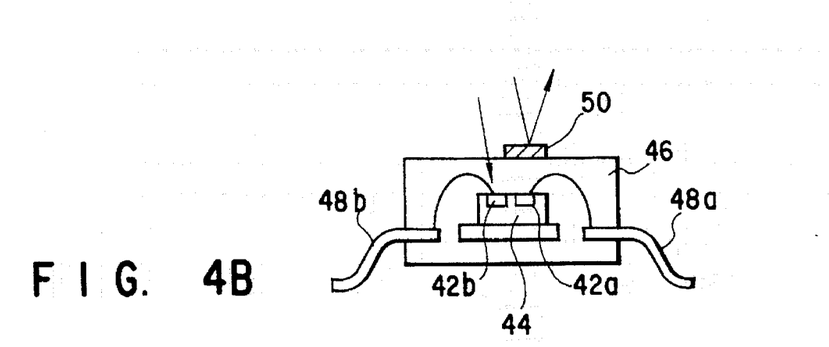
FIG. 4B is a sectional view of the sensor used in the remote control camera according to the second embodiment of the present invention.

FIG. 4B shows a sectional view of the light sensor 42.

In FIG. 4B, a chip 44, made of material such as silicon, is formed on top with the light receiving surfaces 42a and 42b.

A transparent molded package 46 is formed to surround the light receiving chip 44.

A pair of lead frames 48a and 48b are placed on the both sides of the molded package 46.

That area of the top surface of the transparent molded package 46 which allows light incident on the light receiving surface 42a to pass through is covered with the film 50 serving as the visible-light cut filter.

The light receiving surface 42a functions as a light sensor for remote control.

In the remote control camera thus constructed, light transmitted through the lens 40 falls on the light sensor 42 having the light receiving surfaces 42a and 42b.

At this point, only infrared light as a remote control signal is allowed to fall on the light receiving surface 42a because of the provision of the film 50 serving as a visible light cut filter on the optical axis of incident light on the light receiving surface 42a.

On the other hand, light transmitted through the lens 40 is directed onto the light receiving surface 42b of the light sensor 42 as it is.

That is, light containing infrared light and visible light transmitted through the lens 40 is directed onto the light receiving surface 42b of the light sensor 42.

The light receiving surface 42a of the light sensor 42 outputs an electrical signal corresponding to the incident infrared light to a remote control processing circuit 52a and a light measurement circuit 52b.

Each of the remote control processing circuit 52a and the light measurement circuit 52b processes the received electrical signal and then outputs the results to the CPU 54.

The light reflecting surface 42b of the light sensor 42 provides an electrical signal corresponding to the light containing infrared light and visible light to a photometric (light measurement) circuit (CKT) 52c.

The photometric circuit (CKT) 52c processes the received electrical signal and outputs the result to the CPU 54.

To the CPU 54 is connected a switch 56 for setting the remote control mode and a shutter circuit 58 for controlling the shutter according to an exposure value computed by the CPU 54.

Thus, the brightness of a subject corresponding to infrared light can be obtained by providing an output of the light receiving surface 42a of the light sensor 42 to the CPU 54 via the photometric circuit (CKT) 52b.

Also, the brightness of the subject corresponding to infrared light and visible light can be obtained by providing an output of the light receiving surface 42b of the light sensor 42 via the photometric circuit (CKT) 52c.

Thus, the brightness of the subject corresponding to visible light can be computed by subtracting one of the outputs of the photometric circuits (CKTs) 52b and 52c from the other.

Next, the operation of the remote control camera of the second embodiment will be described.

Figure 5:
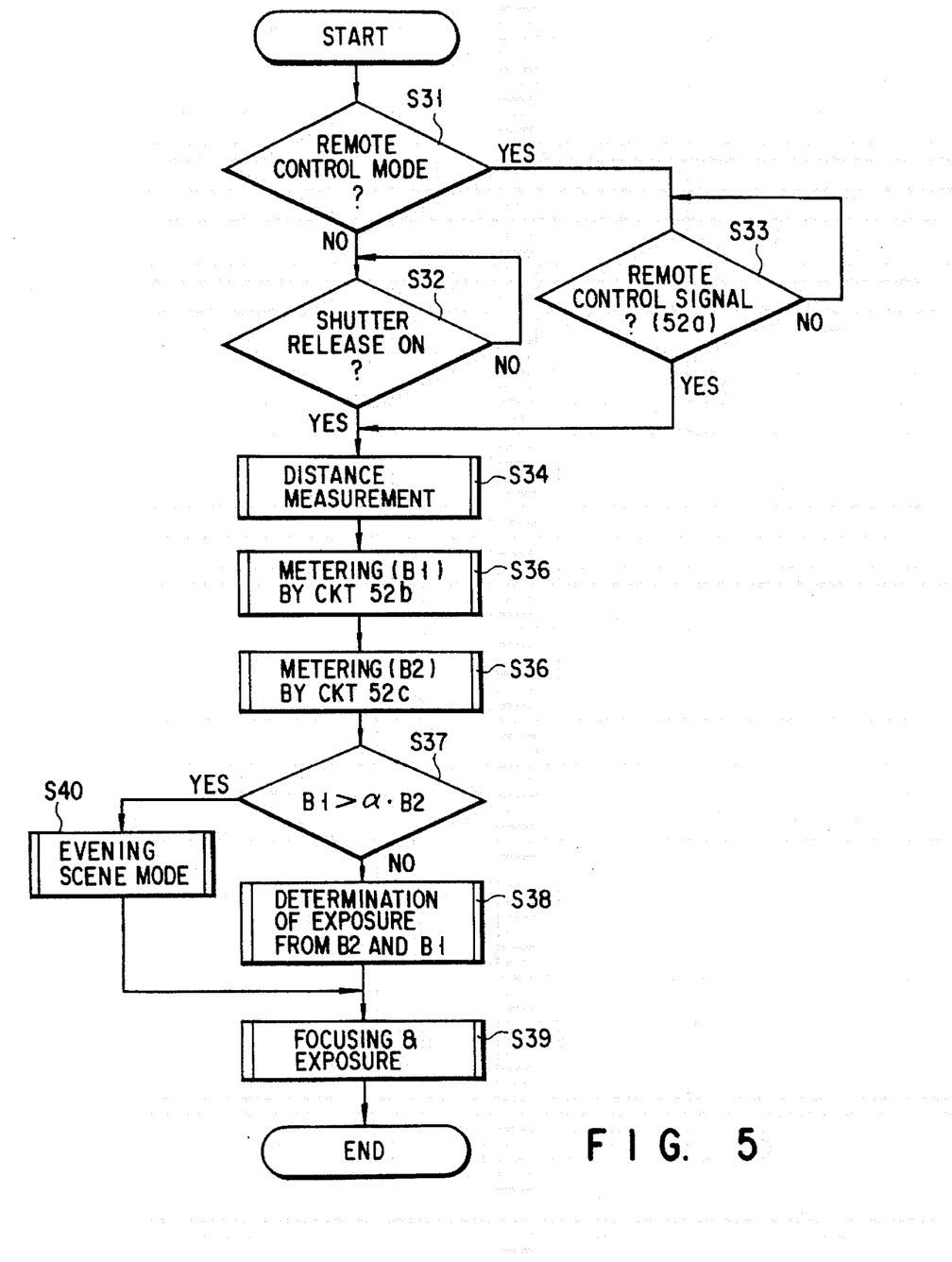
FIG. 5 is a flowchart illustrating the procedure carried out by the CPU of FIG. 4A for the remote control operation of the remote control camera of the second embodiment.

FIG. 5 is a flowchart illustrating the procedure carried out by the CPU 54 for the operation of the remote control camera of the second embodiment.

First, the CPU 54 makes a decision as to whether or not the remote control mode is set by the switch 56 (step S31).

When the remote control mode is set, the CPU 54 detects a remote control signal through the light receiving surface 42a of the light sensor 42 and the remote control processing circuit 52a. If the remote control signal is detected (step S33), then the procedure goes to step S34.

If, on the other hand, the decision in step S31 is that the remote control mode is not set, the CPU 54 makes a decision as to whether or not the shutter release button (not shown) has been depressed (step S32). If the decision is that the shutter release button has been depressed, then the procedure goes to step S34.

In step S34, the CPU 54 determines the distance to the subject according to an output of a built-in ranging device not shown.

The CPU 54 then makes measurements of light using the outputs of the photometric circuits (CKTs) 52b and 52c to obtain measured values B1 and B2 (steps S35 and S36).

In subsequent step S37, the CPU makes a decision as to whether or not the following relationship is established between B1 and B2

$$B1 > \alpha \times B2$$

where $\alpha$ is a given coefficient used to determine the shooting conditions. That is, the coefficient $\alpha$ is used to determine whether the level of infrared light is greater than a predetermined value as in the case where a shot is made with the setting sun in the background.

When $B1 > \alpha \times B2$ is established, the CPU 54 determines that the level of infrared light is greater than the predetermined value as in the case where a shot is made with the setting sun in the background.

In this case, the CPU 54 sets the camera to the evening scene mode and makes an underexposure setting so that the setting sun will not become bleached (step S40). The procedure then goes to step S39.

The second embodiment thus provides an advantage that more proper exposures can be made by a combination of infrared-light and visible-light measurements.

If, on the other hand, $B1 > \alpha \times B2$ is not established, then the CPU 54 determines the subject 10 brightness corresponding to visible light from the difference between the measured values B1 and B2 to determine an exposure setting (step S38). The procedure then goes to step S39.

In step S39, the CPU drives the focusing lens not shown according to the subject distance so that the subject is brought into focus and controls the shutter speed through the shutter circuit 58 according to the computed exposure value to make an exposure. The procedure thus comes to an end.

As described above, the remote control camera according to the second embodiment of the invention can be made simpler in construction and less expensive than the remote control camera of FIG. 1A according to the first embodiment.

In addition, the remote control camera according to the second embodiment of the invention can provide the high-performance remote control feature without being affected by visible light such as sunlight, artificial illumination, etc., because the output of the light receiving surface 42a of the light sensor 42 depends on only infrared light.

Next, a remote control camera according to a third embodiment of the present invention will be described.

Figure 6A:
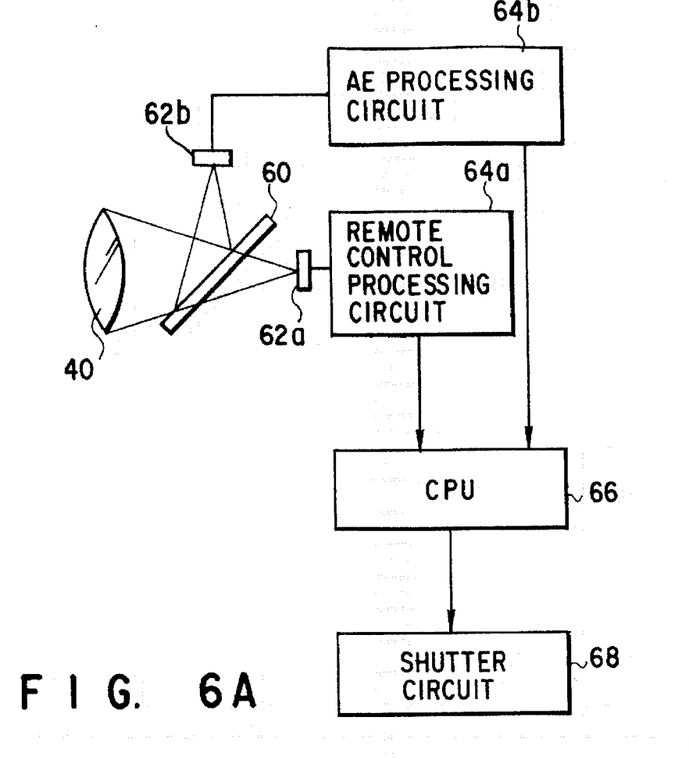
FIG. 6A shows an arrangement of a remote control camera according to a third embodiment of the present invention.

FIG. 6A is a block diagram of the remote control camera according to the third embodiment.

in FIG. 6A, light transmitted through lens 40 is split into infrared-light and visible-light components by a dichroic mirror 60. Only the infrared light is allowed to pass through the dichroic mirror 60 and falls on a remote control sensor 62a.

On the other hand, the visible light is reflected by the dichroic mirror 60 and falls on an exposure sensor 62b.

An output of the remote control sensor 62a, which depends on only infrared light, is processed by a remote control processing circuit 64a and then fed to the CPU 66.

An output of the exposure sensor 62b, which depends on only visible light, is processed by an exposure processing circuit 64b and then fed to the CPU 66.

To the CPU 66 is connected a shutter circuit 68 which controls the shutter not shown according to the computed exposure value by the CPU 66.

As described above, the dichroic mirror 60 has a wavelength-dependent characteristic that reflects visible light and allows infrared light to pass through.

The use of such a dichroic mirror allows the remote control sensor 62a to receive only infrared light and the exposure sensor 62b to receive only visible light.

Thus, the third embodiment of the present invention can perform high-precision remote control and correct exposure control by the use of a single lens 40 as with the first and second embodiments.

Moreover, since the third embodiment uses the dichroic mirror 60 to separate incident light into infrared light and visible light, it is not required to mount any special optical filter on the remote control sensor 62a and the exposure sensor 62b. This will help reduce the manufacturing cost of the camera.

Furthermore, with the third embodiment it is possible to design each of the remote control sensor 62a and the exposure sensor 62b individually, which permits the optimum remote control sensing region and the optimum light metering region to be set.

The third embodiment is effective in designing the exposure sensor 62 without being affected by the remote control system, particularly in cameras that use multi-segmented metering in which a light sensor is split into multi segments to measure the brightness of each different portion of the photographing scene.

Figure 6B:
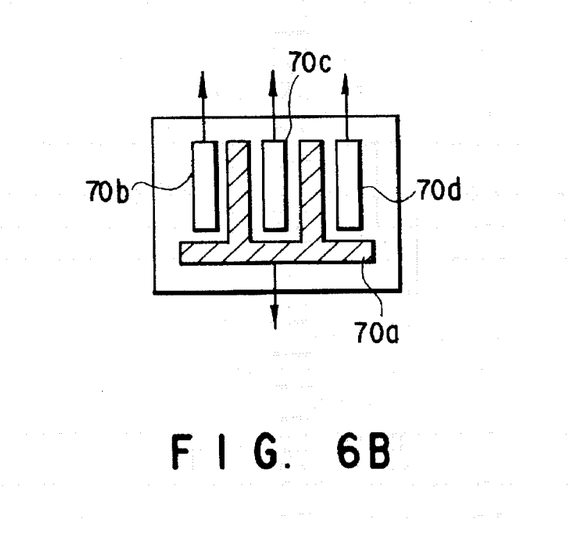
FIG. 6B shows an arrangement of the sensor used in the remote control camera of the third embodiment which is adapted for multi-segment metering.

It should be noted, however, that the second embodiment shown in FIGS. 4A and 4B can also be adapted to multi-segmented metering if the sensor is modified as shown in FIG. 6B.

The sensor shown in FIG. 6B consists of a light receiving surface 70a for remote control and light receiving surfaces 70b, 70c and 70d for exposure control.

The dichroic mirror 60 further includes the following application, which will be described as a fourth embodiment of the present invention.

Figure 7A:
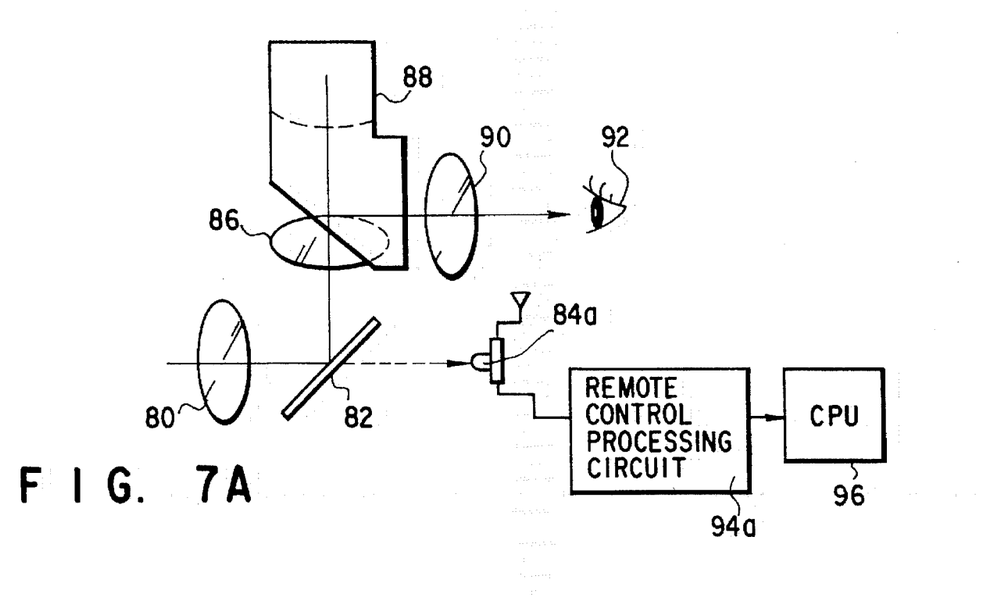
FIG. 7A shows an arrangement of a light receiving section which features a remote control camera according to a fourth embodiment of the present invention.

FIG. 7A shows an arrangement of a light receiving section which features a remote control camera according to the fourth embodiment of the present invention.

In the fourth embodiment, the objective lens of the camera doubles as a remote control light receiving window.

In FIG. 7A, of light transmitted through an objective lens 80, only infrared light is allowed to pass through a dichroic mirror 82, so that it falls on a remote control sensor 84a.

On the other hand, of light transmitted through the lens 80, only visible light is reflected by the dichroic mirror 82 and enters a viewer's eye 92 through a lens 86, a prism 88, and a viewfinder eyepiece 90.

An output of the remote control sensor 84a is processed by a remote control processing circuit 94a and the result is fed to a CPU 96.

Figure 7B:
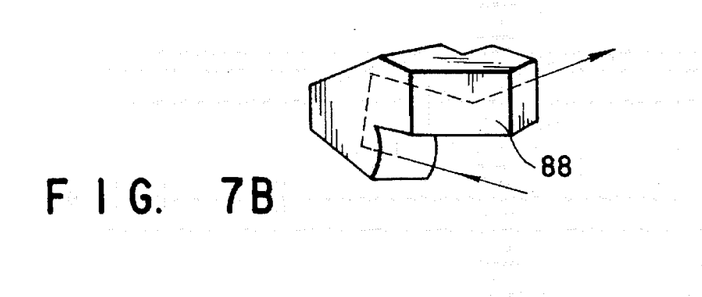
FIG. 7B shows the shape of the prism used in the light receiving section of FIG. 7A.

The prism 88 has such a distinctive shape as shown in FIG. 7B for the purpose of saving space by bending the optical path of incident light.

The dichroic mirror 82 is wavelength-dependent as described above, so that it allows infrared light, which serves as a remote control signal, to pass through and reflects visible light.

As described above, in the fourth embodiment of the invention, a portion that is the most sensitive to a remote control signal is located substantially in the center of the viewfinder screen, which allows an operator of the remote control transmitter to be shot in the center of the photograph.

Next, a remote control camera according to a fifth embodiment of the present invention will be described.

Figure 8:
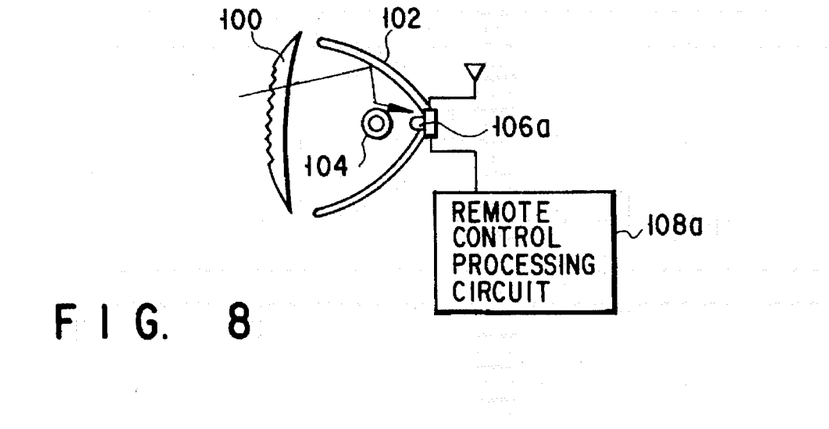
FIG. 8 shows an arrangement of a light receiving section which features a remote control camera according to a fifth embodiment of the present invention.

FIG. 8 shows an arrangement of a light receiving section which features the remote control camera according to the fifth embodiment.

The fifth embodiment is arranged to receive a remote control signal using the flash light projection window of a camera.

In FIG. 8, a remote control light signal transmitted through a Fresnel lens 100 adapted for projecting a flash of light is reflected by a reflector 102 onto a xenon flash tube 104 and then reflected by the tube and falls on a remote control sensor 106a.

The light receiving surface of the sensor 106a is covered with a visible light blocking filter not shown to thereby allow only infrared light to fall on the sensor.

An infrared-light-based output of the remote control sensor 106a is processed by a remote control processing circuit 108a, the result being fed to a CPU not shown.

As described above, in the fifth embodiment, the flash light projection window is used to receive the remote control signal, which makes the construction simple. In addition, the Fresnel lens 100 and the reflector 102 allow a remote control signal to be received from a wide range of directions. For this reason, the remote control transmitter need not be located directly in front of the camera.

Next, a remote control camera according to a sixth embodiment of the present invention will be described.

Figure 9A:
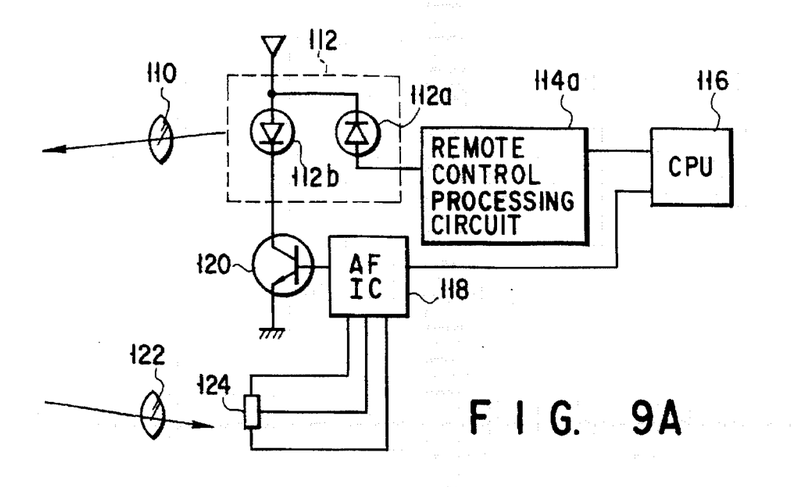
FIG. 9A shows an arrangement of a light receiving section which features a remote control camera according to a sixth embodiment of the present invention.

FIG. 9A shows an arrangement of a light receiving section which features the remote control camera of the sixth embodiment.

In FIG. 9A, light transmitted through a lens 110 through which distance determining light is to be emitted falls on a remote control sensor 112a inside a photoelectric package 112.

The remote control sensor 112a is made of a chip of gallium arsenide as with an infrared-light emitting diode (hereinafter referred to as IRED) 112b.

Unlike the first through fifth embodiments in which the remote control sensor consists of a silicon-based device which is advantageous in cost, in the sixth embodiment, use is made of a gallium-arsenide-based device.

The gallium-arsenide-based device is very sensitive to only infrared light and hence advantageously used to receive an infrared remote control signal.

Thus, an output of the remote control sensor 112a depends on remote control infrared light incident on it.

The output of the remote control sensor 112a is processed by a remote control processing circuit 114a and then output to a CPU 116.

The CPU 116 drives the IRED 112b within the photoelectric package 112 through an autofocus integrated circuit (hereinafter referred to as AFIC) 118 and a transistor 120 to thereby cause the IRED to emit a distance determination signal to a subject not shown through the lens 110.

The light is reflected from the subject and then falls on a position sensor device (hereinafter referred to as PSD) 124 through a lens 122.

The CPU 116 detects the position in the PSD 124 on which the reflected light falls and then determines the subject distance on the principles of triangulation.

The AFIC 118 is an analog IC which has a function of amplifying and performs operations on an output signal current of the PSD 124.

Figure 9B:
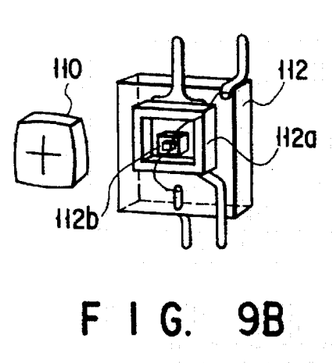
Figure 9C:
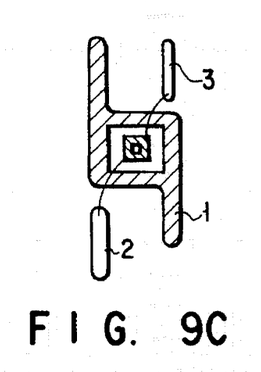
Figure 9D:
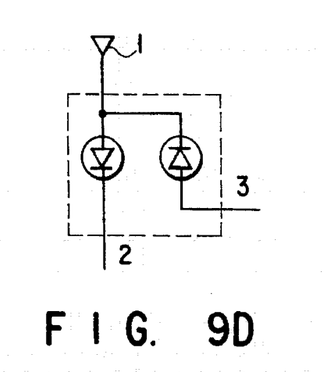

FIGS. 9B, 9C and 9D show an arrangement of the photoelectric package 112.

As shown, the remote control sensor 112a and the IRED 112b are formed on the same semiconductor substrate (chip) of gallium arsenide in the photoelectric package 112.

The IRED 112b is generally made of gallium arsenide. If, therefore, the remote control sensor 112a is formed on the same chip as the IRED 112b, they can be encapsulated into a single package, facilitating the fabrication.

As described above, in the sixth embodiment, since a device itself that forms the remote control sensor 112a has a visible light blocking characteristic, there is no need of any optical filter in particular. In addition, two optical semiconductor devices each with a different function are formed on a single chip and packaged, facilitating the management and assembly of parts.

Next, a remote control camera according to a seventh embodiment of the present invention will be described.

The seventh embodiment consists of a combination of the first and second embodiments described previously and can be made to correspond in arrangement to the first embodiment shown in FIGS. 1A and 1B.

Figure 11:
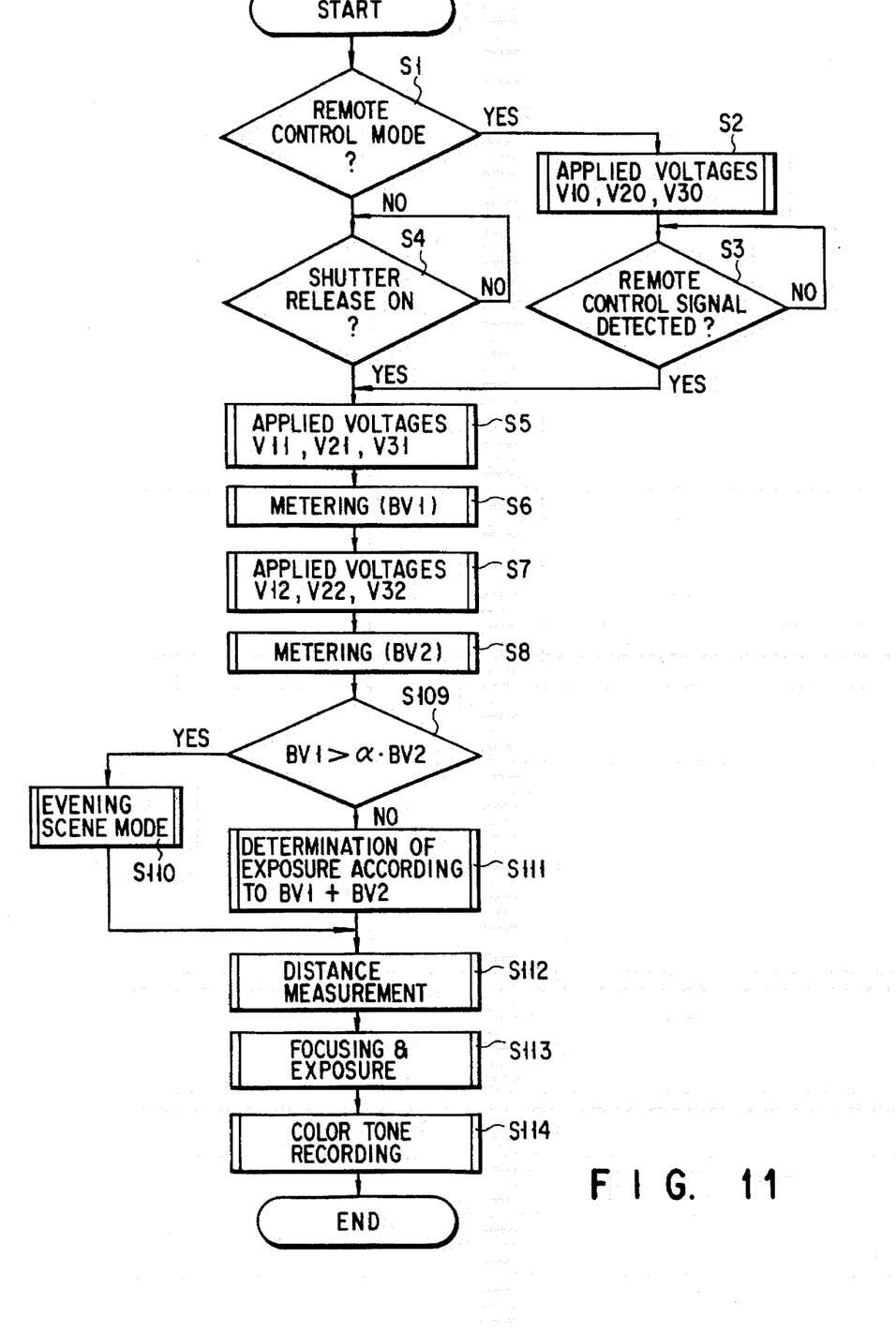
FIG. 11 is a flowchart illustrating the procedure carried out by the CPU for the remote control operation of the remote control camera according to a seventh embodiment of the present invention.

FIG. 11 is a flowchart illustrating the procedure carried out by the CPU 18 for the operation of the remote control camera of the seventh embodiment.

In this flowchart, steps S1 through S8 are the same as those in the flowchart shown in FIG. 3 for the first embodiment.

It is to be noted, however, that the CPU 18 measures long-wavelength components of visible light in steps S5 and S6 and measures short-wavelength components of visible light in steps S7 and S8.

In step S109, the CPU 18 makes a decision of whether BV1>α×BV2 is established or not as in step S37 in the flowchart shown in FIG. 5 for the second embodiment.

Here, α is a predetermined coefficient which is used to determine shooting conditions. That is, the coefficient is used to determine whether the level of infrared light is greater than a given value as in the case where a shot is made with the setting sun in the background.

When BV1>α×BV2 is established, the level of infrared light is greater than the predetermined value. Under this condition, the CPU 18 determines that a shot is being made with the setting sun in the background.

In this case, the CPU 18 sets the camera to the evening scene mode and makes an underexposure setting so that the setting sun will not become bleached (step S110). The procedure then goes to step S112.

If, on the other hand, the decision in step S109 is that BV1>α×BV2 is not established, then the CPU 18 determines the subject brightness corresponding to visible light from the difference between the measured values BV1 and BV2 to determine an exposure setting (step S111). The procedure then goes to step S112.

In step S112, the CPU 18 determines the subject distance by the known ranging means not shown to obtain distance information.

In subsequent step S113, the CPU drives the known autofocusing means not shown according to the subject distance so that the subject is brought into focus and then performs the exposure sequence. After that, the CPU 18 makes a recording of the color tone of the scene as needed (step S114) and the procedure then comes to an end.

As described above, the seventh embodiment can also detect the color tone peculiar to a shooting scene by the use of single light sensor 12, allowing the appropriate exposure control to the shooting scene.

When a film is used which has a magnetic recording stripe capable of recording shooting information and so on, color tone information detected in step S110 can be recorded on the magnetic recording stripe (S113).

That is, the use of the information recording allows film processing and printing to be performed to suit user's liking.

Next, a remote control camera according to an eighth embodiment of the present invention will be described.

The eighth embodiment is an advanced version of the first embodiment described previously and corresponds in arrangement to FIGS. 1A and 1B.

Figure 12:
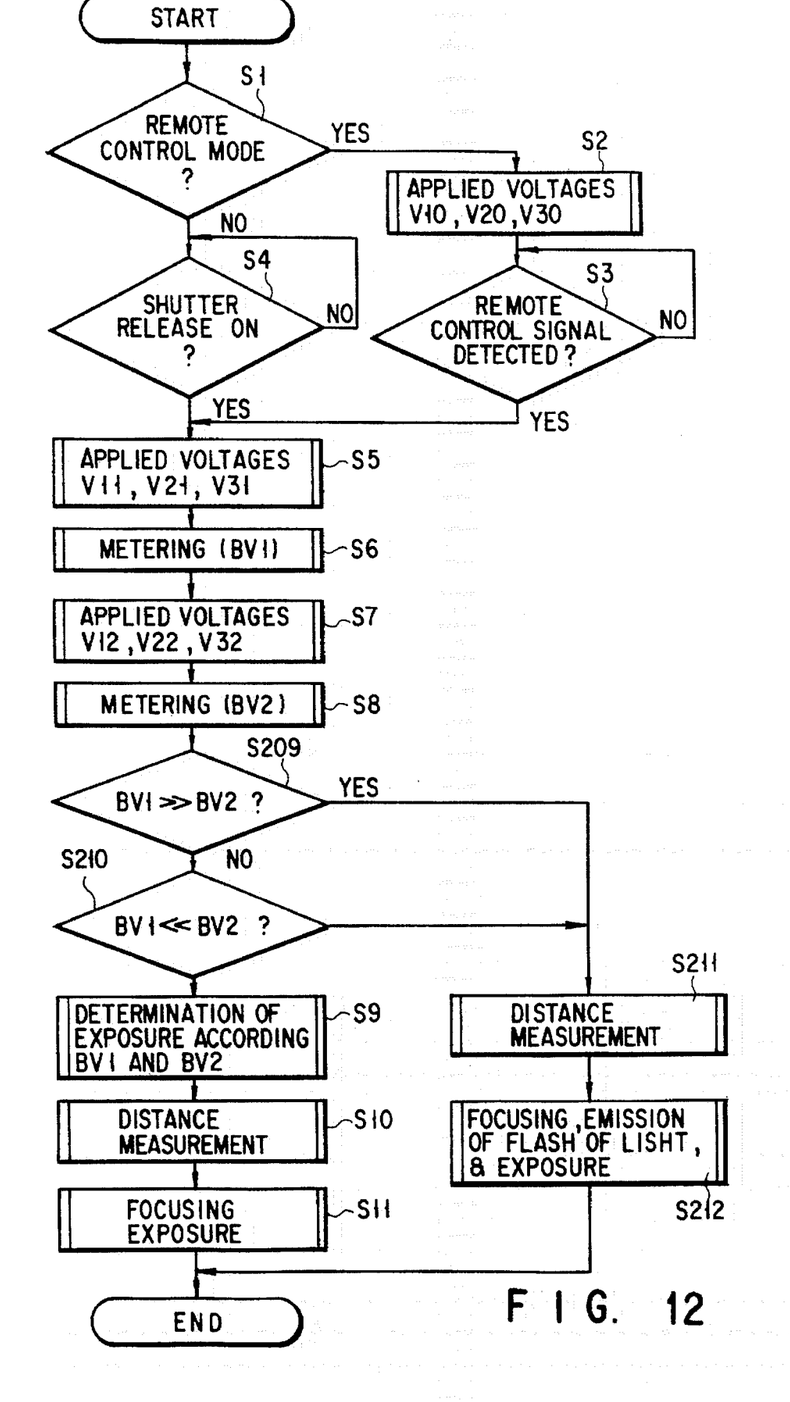
FIG. 12 is a flowchart illustrating the procedure carried out by the CPU for the remote control operation of the remote control camera according to an eighth embodiment of the present invention.

FIG. 12 is a flowchart illustrating the procedure carried out by the CPU 18 for the operation of the remote control camera of the eighth embodiment.

In this flowchart, steps S1 through S8 are the same as those in the flowchart shown in FIG. 3 for the first embodiment.

In steps S209 and S210, the CPU 18 decides whether or not there is an unbalance (BV1>>BV2 or BV1<<BV2) between BV1 and BV2.

In the absence of an unbalance between BV1 and BV2, the CPU 18 performs steps S9, S10 and S11 in sequence as in the case of the flowchart shown in FIG. 3 for the first embodiment. In the presence of an unbalance BV1>>BV2 or BV1<<BV2, the CPU performs the following decision processing.

That is, in the presence of an unbalance BV1>>BV2 or BV1<<BV2 between BV1 and BV2, the CPU makes a decision that a shot is made in shooting conditions in which red light is deficient, such as in underwater, or bluish light is illuminated such as under a fluorescent lamp and then goes to steps S211 and S212.

In such a case, the normal exposure control will result in a bluish photograph. Thus, the CPU 18 determines the subject distance in step S211 using the known ranging means not shown to obtain distance information and then, in step S212, drives the known AF means not shown according to the distance information so that the subject is brought into focus, turns on the electronic flash 19 to compensate for lack of the amount of light, and carries out the exposure sequence with color balance compensated.

As described above, the eighth embodiment uses a variable wavelength filter the passband of which can be varied electrically by controlling the applied voltages to the ECB cells constructing the filter and hence can selectively use various wavelength bands for light metering. Thus, exposure control and flash control can be performed more precisely with even the color tone of a photographing scene taken into consideration.

As described above, according to the preferred embodiments of the present invention, a high-performance remote control light sensor can be incorporated into a compact camera without difficulty, thus providing cameras which are also good in design at low cost.

In addition, according to the preferred embodiments of the present invention, the number of windows in the front of the camera body can be decreased to increase the flexibility of layout, which will ensures that the camera size can be decreased and cameras which are also good in design can be provided at low cost.

The preferred embodiments of the present invention described above are summarized as follows:

(1) A camera characterized by comprising photometric means for measuring light reflected from a subject through the use of optical means to thereby measure the brightness of the subject; and light sensor means for receiving a light signal emitted from a remote control transmitter when operated by a photographer through part of the optical means.

(2) A camera, as described in (1), which is characterized in that an electrically controllable variable wavelength filter is provided in the optical path of the optical means, and the photometric means and the light sensor means are made of a single device.

(3) A camera, as described in (1), which is characterized in that a wavelength selective filter means is provided in the optical path of the optical means so that visible light falls on the photometric means and infrared light falls on the light sensor means.

(4) A camera characterized by comprising viewfinder means for viewing a subject and light sensor means for receiving a light signal from a remote control transmitter through a lens in the viewfinder.

(5) An autoexposure camera which determines exposure on the basis of a first sensor for receiving visible light and infrared light, a second sensor for receiving only infrared light, and the difference between outputs of the first and second sensors.

(6) A camera characterized by comprising a light sensor made of gallium arsenide for receiving infrared light emitted from a remote control camera and a light emitting device made of gallium arsenide for emitting infrared light to determine the distance to a subject, the light emitting device and the light sensor being formed on the same semiconductor chip.

(7) A camera characterized by comprising photometric means for selecting different wavelength bands on a time division basis and control means responsive to an output of the photometric means for performing exposure control of the camera.

According to the present invention, therefore, a remote control camera is provided which can attain its remote control feature certainly and can be made compact.

Additional embodiments of the present invention will be apparent to those skilled in the art from consideration of the specification and practice of the present invention disclosed therein. It is intended that the specification and examples be considered as exemplary only, with the true scope of the present invention being indicated by the following claims.

What is claimed is:

1. A remote control camera comprising:

a camera body having an opening formed on a front portion thereof for introducing optical information about a subject;

a remote control light sensor provided inside said camera body for receiving a remote control light signal emitted from an external remote control transmitter;

an optical device provided in said camera body opposing said opening, said optical device splitting light introduced through said opening into said remote control light signal and another light signal which is used for performing an operation in said camera, and directing at least said remote control light signal onto said remote control light sensor; and a control unit provided in said camera body, said control unit being responsive to an output signal from said remote control light sensor for controlling a predetermined operation associated with said camera body.

2. A remote control camera comprising:

a camera body;

a light sensor provided inside said camera body for receiving a remote control light signal emitted from an external remote control transmitter and for measuring a brightness of a subject in response to visible light;

an optical member provided on a front portion of said light sensor, said optical member being responsive to a control signal for selectively causing one of visible light and infrared light to pass therethrough; and a control unit which provides said control signal to said optical member based on a predetermined operation sequence associated with said camera body, and which controls a predetermined operation associated with said camera body in response to an output signal from said light sensor.

3. A remote control camera according to claim 2, wherein said optical member includes a variable wavelength filter having wavelength passbands which can be varied by changing a voltage applied thereto.

4. A remote control camera according to claim 2, wherein said optical member includes a variable wavelength filter having a plurality of electric-field controlled birefringent cells which are stacked on each other.

5. A remote control camera comprising:

a camera body;

a photoelectric unit provided in said camera body, said photoelectric unit including a light emitting device for emitting light to measure a distance to a subject and a light receiving device for receiving a remote control signal emitted from an external remote control transmitter, said light emitting device and said light receiving device being connected together at respective ends thereof and being formed on a single semiconductor substrate in a single package; and a single optical member provided on a front portion of said photoelectric unit.

6. A remote control camera according to claim 5, wherein said semiconductor substrate comprises gallium arsenide.

7. A remote control camera comprising:

a camera body having an optical device;

a photometric unit which receives light reflected from a subject through said optical device and which measures a brightness of the subject;

a light receiving device which receives a remote control light signal emitted from an external remote control transmitter through a part of said optical device; and a control unit which is responsive to an output signal from said light receiving device for controlling a predetermined operation associated with said camera body, wherein said optical device includes an electrically controlled variable wavelength filter on an optical path thereof, and said photometric unit and said light receiving device are formed in common.

8. A remote control camera comprising:

a camera body having an optical device;

a photometric unit which receives light reflected from a subject through said optical device and which measures a brightness of the subject;

a light receiving device which receives a remote control light signal emitted from an external remote control transmitter through a part of said optical device;

a control unit which is responsive to an output signal from said light receiving device for controlling a predetermined operation associated with said camera body; and a wavelength selective filter device provided in an optical path of said optical device, said wavelength selective filter device being arranged such that visible light falls on said photometric unit and such that infrared light falls on said light receiving device.

9. A remote control camera comprising:

a camera body;

a viewfinder provided within said camera body and having a lens for viewing a subject; and a light receiving device which receives a remote control light signal emitted from an external remote control transmitter through said lens of said viewfinder.

10. A remote control camera comprising:

a camera body;

an electronic flash unit having a window, said electronic flash unit being provided in said camera body for illuminating a subject through said window; and a light sensor device which receives a remote control light signal emitted from an external remote control transmitter through said window of said electronic flash unit.

11. A remote control camera comprising:

a camera body;

a first light sensor for receiving visible light and infrared light and a second light sensor for receiving only infrared light, said first and second light sensors being provided in said camera body; and a control unit which determines an exposure setting based on a difference between outputs from said first and second light sensors, and which controls a predetermined operation associated with said camera body in response to an output of said second light sensor when said second light sensor receives an infrared remote control light signal emitted from an external remote control transmitter.

12. A remote control camera comprising:

a camera body having an opening for receiving outside light;

an operation determining unit which determines a predetermined operation associated with said camera body based on light passing through said opening;

an optical device which splits light emitted from an external remote control transmitter and passed through said opening, said optical device splitting said light into respective light components which are used for performing respective operations in said camera; and a receiving device which receives a light component output from the optical device and which outputs responsive thereto a signal that allows said predetermined operation associated with said camera body to be performed.

13. A remote control camera according to claim 12, wherein said operation determining unit includes a control device which controls an exposure of said camera body.

14. A remote control camera according to claim 12, wherein said opening enables surrounding light and light emitted from said remote control transmitter to pass therethrough.

15. A camera comprising:

a photometric unit which measures light in a plurality of different wavelength passbands;

a selecting unit which selectively sets said plurality of different wavelength passbands on a time-division basis; and a control unit which is responsive to an externally applied instruction for controlling an exposure of said camera based on an output from said photometric unit.

* * * * *